United States Patent
Daems et al.

[11] Patent Number: 6,132,927
[45] Date of Patent: Oct. 17, 2000

[54] THIN METAL RECORDING LAYER COATED FROM AQUEOUS MEDIUM

[75] Inventors: Eddie Daems, Herentals; Hieronymus Andriessen, Beerse; Luc Leenders, Herentals; Steven Lezy, Antwerp, all of Belgium

[73] Assignee: Agfa-Gevaert, N.V., Mortsel, Belgium

[21] Appl. No.: 09/058,864

[22] Filed: Apr. 13, 1998

Related U.S. Application Data

[60] Provisional application No. 60/049,396, Jun. 10, 1997.

[30] Foreign Application Priority Data

Apr. 29, 1997 [EP] European Pat. Off. .............. 97201282

[51] Int. Cl.[7] ..................................................... G03C 1/76
[52] U.S. Cl. ......................................................... 430/270.1
[58] Field of Search ......................... 430/270.1; 427/108, 427/127, 208.4, 443.1

[56] References Cited

U.S. PATENT DOCUMENTS

| | | |
|---|---|---|
| 4,128,691 | 12/1978 | Shirahata et al. . |
| 4,596,722 | 6/1986 | Warszawski . |
| 5,306,335 | 4/1994 | Senda et al. ............................ 106/1.22 |
| 5,962,181 | 10/1999 | Daems et al. ........................... 430/201 |

FOREIGN PATENT DOCUMENTS

| | | |
|---|---|---|
| 0 225 647 A2 | 6/1987 | European Pat. Off. . |
| 0 225 647 A3 | 6/1987 | European Pat. Off. . |
| 0 361 204 A2 | 4/1990 | European Pat. Off. . |
| 0 361 204 A3 | 4/1990 | European Pat. Off. . |

*Primary Examiner*—Janet Baxter
*Assistant Examiner*—Barbara Gilmore
*Attorney, Agent, or Firm*—Breiner & Breiner

[57] ABSTRACT

A process was disclosed for the preparation of a heat mode recording element comprising a transparent support and a thin metal recording layer, characterized in that said thin metal layer was formed by the following steps: (1) preparing a solution containing metal ions and preferably a binder, (2) reducing said metal ions by a reducing agent, (3) coating said aqueous medium on said transparent support, optionally after removal of superfluous salts.

The process disclosed is less complicated and more economic than previously known methods for applying a thin metal recording film.

16 Claims, No Drawings

THIN METAL RECORDING LAYER COATED FROM AQUEOUS MEDIUM

RELATED APPLICATION

Benefit is claimed of U.S. Provisional Application Serial No. 60/049,396 filed Jun. 10, 1997.

1. FIELD OF THE INVENTION

The present invention relates to a process for the manufacturing of a heat mode material based on a thin metal layer under easier and cheaper manufacturing conditions.

2. BACKGROUND OF THE INVENTION

Conventional photographic materials based on silver halide are used for a large variety of applications. As is generally known silver halide materials have the advantage of high potential intrinsic sensitivity and excellent image quality. On the other hand they show the drawback of requiring several wet processing steps employing chemical ingredients which are suspect from an ecological point of view.

In the past several proposals have been made for obtaining an imaging element that can be developed using only dry development steps without the need of processing liquids as it is the case with silver halide photographic materials.

A dry imaging system known since quite a while is 3M's dry silver technology. It is a catalytic process which couples the light-capturing capability of silver halide to the image-forming capability of organic silver salts.

Another type of non-conventional materials as alternative for silver halide is based on photopolymerisation. The use of photopolymerizable compositions for the production of images by information-wise exposure thereof to actinic radiation is known since quite a while. These methods are based on the principle of introducing a differentiation in properties between the exposed and non-exposed parts of the photopolymerizable composition e.g. a difference in adhesion, conductivity, refractive index, tackiness, permeability, diffusibility of incorporated substances e.g. dyes etc. The thus produced differences may be subsequently employed in a dry treatment step to produce a visible image and/or master for printing e.g. a lithographic or electrostatic printing master.

As a further alternative for silver halide chemistry dry imaging elements are known that can be image-wise exposed using an image-wise distribution of heat. When this heat pattern is applied directly by means of a thermal head such elements are called thermographic materials. When the heat pattern is applied by the transformation of intense laser light into heat these elements are called heat mode materials or thermal imaging media. They offer the additional advantage compared to most photo mode systems that they do not need to be handled in a dark room nor that any other protection from ambient light is needed.

In a particular type of heat mode elements, e.g. as disclosed in EP 0 674 217, density is generated by image-wise chemical reduction of organic metal salts, preferably silver salts such as silver behenate, without the presence of catalytic amounts of exposed silver halide such it is the case in the dry silver system.

Another important category of heat mode recording materials is based on change of adhesion, e.g. as disclosed in U.S. Pat. No. 4,123,309, U.S. Pat. No. 4,123,578, U.S. Pat. No. 4,157,412, U.S. Pat. No. 4,547,456 and PCT publ. Nos. WO 88/04237, WO 93/03928, and WO 95/00342.

In still another particular type of thermal recording or heat mode recording materials information is recorded by creating differences in reflection and/or in transmission on the recording layer. The recording layer has high optical density and absorbs radiation beams which impinge thereon. The conversion of radiation into heat brings about a local temperature rise, causing a thermal change such as evaporation or ablation to take place in the recording layer. As a result, the irradiated parts of the recording layer are totally or partially removed, and a difference in optical density is formed between the irradiated parts and the unirradiated parts (cf. U.S. Pat. Nos. 4,216,501, 4,233,626, 4,188,214 and 4,291,119 and British Pat. No. 2,026,346)

The recording layer of such heat mode recording materials is usually made of metals, dyes, or polymers. Recording materials like this are described in 'Electron, Ion and Laser Beam Technology", by M. L. Levene et al.; The Proceedings of the Eleventh Symposium (1969); "Electronics" (Mar. 18, 1968), P. 50; "The Bell System Technical Journal", by D. Maydan, Vol. 50 (1971), P. 1761; and "Science", by C. O. Carlson, Vol. 154 (1966), P. 1550.

Recording on such thermal recording materials is usually accomplished by converting the information to be recorded into electrical time series signals and scanning the recording material with a laser beam which is modulated in accordance with the signals. This method is advantageous in that recording images can be obtained on real time (i.e. instantaneously). Recording materials of this type are called "direct read after write" (DRAW) materials. DRAW recording materials can be used as a medium for recording an imagewise modulated laser beam to produce a human readable or machine readable record. Human readable records are e.g. micro-images that can be read on enlargement and projection. An example of a machine readable DRAW recording material is the optical disc. To date for the production of optical discs tellurium and its alloys have been used most widely to form highly reflective thin metal films wherein heating with laser beam locally reduces reflectivity by pit formation (ref. e.g. the periodical 'Physik in unserer Zeit', 15. Jahrg. 1984/Nr. 5, 129–130 the article "Optische Datenspeicher" by Jochen Fricke). Tellurium is toxic and has poor archival properties because of its sensitivity to oxygen and humidity. Other metals suited for use in DRAW heat-mode recording are given in U.S. Pat. No. 4,499,178 and U.S. Pat. No. 4,388,400. To avoid the toxicity problem other relatively low melting metals such as bismuth have been introduced in the production of a heat-mode recording layer. By exposing such a recording element very shortly by pulses of a high-power laser the writing spot ablates or melts a small amount of the bismuth layer. On melting the layer contracts on the heated spot by surface tension thus forming small cavitations or holes. As a result light can pass through these cavitations and the density is lowered to a certain Dmin value depending on the laser energy irradiated.

According to EP 0 384 041 a process is provided for the production of a heat mode recording material having "direct read after write" (DRAW) possibilities wherein a web support is provided with a heat mode recording thin metal layer, preferably a bismuth layer, characterized in that in the same vacuum environment a protective organic resin layer in web form is laminated to said supported recording layer by means of an adhesive layer.

A commercially available material manufactured according to the principles of cited EP 0 384 041 is MASTER-TOOL MT8, registered trade name, marketed by Agfa-Gevaert N.V. It is mostly used after recording as master in the manufacturing of microelectronic circuits and printed circuit boards. We refer to the description in *Circuit World*, Vol. 22, No. 3, April 1996. The material comprises a double-sided subbed polyethylene terephthalate (PET) support, carrying on one side a bismuth layer of about 0.25 μm thickness deposited in vacuo, a 8 μm thick weak adhesive layer, and a thin PET protective layer of 12 μm thickness. On the other side of the subbed PET support a backing layer is provided.

A drawback of the method of preparation of a thin bismuth recording layer by vacuum deposition is the fact that this is a complicated, cumbersome and expensive process.

The present invention extends the teachings on heat mode materials based on a thin metal recording layer.

It is the object of the present invention to provide a simple, straightforward and economic process for the preparation of a heat mode element based on a thin metal layer.

3. SUMMARY OF THE INVENTION

The object of the present invention is realized by providing a process for the preparation of a heat mode recording element comprising a transparent support and a thin metal recording layer, characterized in that said thin metal layer is formed by the following steps:

(1) preparing an aqueous medium containing ions of a metal, (2) reducing said metal ions by a reducing agent thus forming metal particles, (3) coating said aqueous medium containing said metal particles on said transparent support.

In the farmost preferred embodiment of the present invention the metal is bismuth.

Preferably, the process comprises an additional step (2bis) being a removal of all superfluous ions from the solution containing the metal particles, e.g. by ultracentrifugation and redispersing, by flocculation, washing and redispersing, or by ultrafiltration.

It was unexpectedly found that application of a bismuth layer by a simple coating technique instead of by the complicated vacuum deposition method yielded a thin bismuth layer that was perfectly suitable for image differention by intense laser exposure.

4. DETAILED DESCRIPTION

The different elements constituting the heat mode recording material obtained by the process according to the present invention will now be explained in more detail.

Useful transparent organic resin supports include e.g. cellulose nitrate film, cellulose acetate film, polyvinylacetal film, polystyrene film, polyethylene terephthalate film, polycarbonate film, polyvinylchloride film or poly-Alpha-olefin films such as polyethylene or polypropylene film. The thickness of such organic resin film is preferably comprised between 0.05 and 0.35 mm. In a most preferred embodiment of the present invention the support is a polyethylene terephthalate layer provided with a subbing layer. This subbing layer can be applied before or after stretching of the polyester film support. The polyester film support is preferably biaxially stretched at an elevated temperature of e.g. 70–120° C., reducing its thickness by about ½ to ⅓ or more and increasing its area 2 to 9 times. The stretching may be accomplished in two stages, transversal and longitudinal in either order or simultaneously. The subbing layer is preferably applied by aqueous coating between the longitudinal and transversal stretch, in a thickness of 0.1 to 5 μm. In case of a bismuth recording layer the subbing layer preferably contains, as described in European Patent Application EP 0 464 906, a homopolymer or copolymer of a monomer comprising covalently bound chlorine. Examples of said homopolymers or copolymers suitable for use in the subbing layer are e.g. polyvinyl chloride, polyvinylidene chloride, a copolymer of vinylidene chloride, an acrylic ester and itaconic acid, a copolymer of vinyl chloride and vinylidene chloride, a copolymer of vinyl chloride and vinyl acetate, a copolymer of butylacrylate, vinyl acetate and vinyl chloride or vinylidene chloride, a copolymer of vinyl chloride, vinylidene chloride and itaconic acid, a copolymer of vinyl chloride, vinyl acetate and vinyl alcohol etc. Polymers that are water dispersable are preferred since they allow aqueous coating of the subbing layer which is ecologically advantageous.

The process for preparing the thin metal layer on the transparent support will now be explained on the hand of the preferred embodiment wherein the metal is bismuth.

In a first step (1) an aqueous solution of bismuth ions is prepared. As most suitable bismuth salt bismuth nitrate is chosen. Almost all bismuth salts are poorly soluble in water. In order to maintain a sufficient amount of bismuth ions in solution, it is necessary to add a complexing agent. A preferred complexant is simply the well-known ethylenediaminetetraacetic acid (EDTA) or a homologous compound or a salt thereof. Another preferred one is citrate, e.g. triammonium citrate. Other suitable complexants include diethylenetriamine-pentaacetic acid (DTPA), trans-1,2-diaminocyclohexane-N,N,N',N'-tetraacetic acid (CDTA), ethyleneglycol-O,O'-bis(2-aminoethyl)-N,N,N',N'-tetraacetic acid (EGTA), N-(2-hydroxyethyl) ethylenediamine-N,N,N'-triacetic acid (HEDTA), etc.. In order to keep the metal bismuth that will be formed by reduction in the next step in dispersion a protective binder is preferably added to the aqueous medium. A particularly preferred protective binder is carboxymethylcellulose (CMC), preferably of the high viscosity type. Other possible binders include gelatin, arabic gum, poly(acrylic acid), cellulose derivatives and other polysaccharides. However, it will be clear from the examples furtheron that the use of CMC favours a low Dmin. The solution can further contain a so-called dispersing aid (also called co-dispersing agent). Suitable dispersing aids in the case of bismuth are pyrophosphates, more particularly a hexametaphosphate such as sodium hexametaphosphate. Probably, the hexametaphosphate adsorbs to the surface of the bismuth particles so that they become negatively charged. By electrostatic repulsion they are kept in dispersion.

In a following step (2) the bismuth ions in the solution are reduced to metal bismuth particles by means of the addition of a reducing agent. The metal particles are kept in dispersion by the presence of the binder and dispersing aid as described above. A preferred reducing agent is sodium hydrosulphite. Another suitable reducing agent is $KBH_4$. Others include glucose, formaldehyde, tin(II)chloride. The reducing agent can be added to the original bismuth salt solution as a solid powder. On the other hand the reducing agent can be dissolved separately and added to the bismuth salt solution according to a single jet or a double jet procedure (see examples furtheron). When the reduction is substantially completed the aqeous medium can directly be coated according to step (3), but more preferably the superfluous salts are first removed from the aqueous medium in a step 2bis, by well-known methods such as ultracentrifugation followed by redispersing, flocculation and washing followed by redispersing, or ultrafiltration. In the case of ultracentrifugation, and using CMC as binder a bismuth-CMC deposit is separated. The ultracentrifugation step may be repeated after washing with fresh water. The final deposit is redispersed in an aqueous medium, preferably containing the same or different binder and/or dispersion aid as the original solution. In the case of a bismuth-CMC deposit the redispersing aqueous medium preferably contains the same dispersing aid as the original solution, e.g. sodium hexametaphosphate. In the final aqueous medium preferable an antioxidant, added at any stage of the preparation, such as ascorbic acid or a derivative thereof is present in order to avoid oxidation to bismuth oxide which would lead to an unacceptable density loss during drying after coating or during conservation of the unprotected bismuth layer. Finally, after the addition of one or more coating agents the obtained aqueous medium is coated on the transparent substrate by means of a conventional coating technique.

Suitable coating agents include non-ionic agents such as saponins, alkylene oxides e.g. polyethylene glycol, polyethylene glycol/polypropylen glycol condensation products, polyethylene glycol alkyl esters or polyethylene glycol alkylaryl esters, polyethylene glycol esters, polyethylene glycol sorbitan esters, polyalkylene glycol alkylamines or alkylamides, silicone-polyethylene oxide adducts, glycidol derivaties, fatty acid esters of polyhydric alcohols and alkyl esters of saccharides; anionic agenst comprising an acid group such as a carboxy, sulpho, phospho, sulphuric or phosphoric ester group; ampholytic agents such as aminoacids, aminoalkyl sulphonic acids, aminoalkyl sulphates or phosphates, alkyl betaines, and amine-N-oxides; and cationic agents such as aklylamine salts, aliphatic, aromatic, or heterocyclic quaternary ammonium salts, aliphatic or heterocyclic ring-containing phosphonium or sulphonium salts. Other suitable surfactants include perfluorinated compounds.

The particle size of the reduced metalic bismuth is preferably comprised between 5 and 300 nm, most preferably 10 and 200 nm. The thickness of this Bi layer is preferably comprised between 0.1 and 1.5 $\mu$m. When this thickness is too low the recorded images do not have sufficient density. When on the other hand the thickness is too high the sensitivity tends to decrease and the minimal density, i.e. the density after laser recording on the exposed areas tends to be higher.

The formation of the thin metal recording layer has been described on the hand of the preferred embodiment wherein the metal is bismuth. However, the scope of the present invention is not limited to bismuth, but extends to other metals that can form thin metal recording layers by a similar procedure. Possible other metals for the recording layer in this invention include Mg, Mn, Cu, Ag, Au, Zn, Cd, Al, Ga, In, Ge, Sn, As, Sb, Se, Te, Sr, Cu, La, Pb, Nd, Ba, Be, Ca, and Ce.

It will be readily understood that for each particular metal the choice of the metal ions, the complexant if any, the binder and dispersing aid, the reducing agent, etc., must be optimized and that the preferred embodiments will in most cases deviate from the preferred embodiments when the metal is bismuth.

Since the obtained metal layer is very sensitive to mechanical damage a protective element is preferably provided on top of the metal layer. In a particular embodiment this protective element comprises a transparent organic resin, acting as cover sheet, and an adhesive layer, which are together laminated on top of the metal layer, the adhesive layer facing the metal layer.

The cover sheet can be chosen from the group of polymeric resins usable for the support of the heat mode element. In a preferred embodiment the cover sheet is also polyethylene terephthalate but preferably substantially thinner (about 10 $\mu$m) than the polyethylene terephthalate of the support.

For the adherence of the hard protective outermost resin layer to the heat mode recording layer preferably a layer of a pressure-sensitive adhesive resin can be used. Examples of such resins are described in U.S. Pat. No. 4,033,770 for use in the production of adhesive transfers (decalcomanias) by the silver complex diffusion transfer process, in the Canadian Patent 728,607 and in the U.S. Pat. No. 3,131,106.

Pressure-sensitive adhesives are usually composed of (a) thermoplastic polymer(s) having some elasticity and tackiness at room temperature (about 20° C.), which is controlled optionally with a plasticizer and/or tackifying resin. A thermoplastic polymer is completely plastic if there is no recovery on removal of stress and completely elastic if recovery is instantaneous and complete.

Particularly suitable pressure-sensitive adhesives are selected from the group of polyterpene resins, low density polyethylene, a copoly(ethylene/vinyl acetate), a poly $(C_1-C_{16})$alkyl acrylate, a mixture of poly$(C_1-C_{16})$alkyl acrylate with polyvinyl acetate, and copoly(vinylacetate-acrylate) being tacky at 20° C.

In the production of a pressure-adhesive layer an intrinsically non-tacky polymer may be tackified by the adding of a tackifying substance, e.g. plasticizer or other tackifying resin.

Examples of suitable tackifying resins are the terpene tackifying resins described in the periodical "Adhesives Age", Vol. 31, No. 12, November 1988, p. 28–29.

According to another embodiment the protective element is laminated or adhered to the heat-mode recording layer by means of a heat-sensitive also called heat-activatable adhesive layer or thermoadhesive layer, examples of which are described also in U.S. Pat. No. 4,033,770. In such embodiment the laminating material consisting of adhesive layer and abrasion resistant protective layer and/or the recording web material to be protected by lamination are heated in their contacting area to a temperature beyond the softening point of the adhesive. Heat may be supplied by electrical energy to at least one of the rollers between which the laminate is formed or it may be supplied by means of infra-red radiation. The laminating may proceed likewise by heat generated by high-frequency micro-waves as described e.g. in published EP-A 0 278 818 directed to a method for applying a plastic covering layer to documents.

A survey of pressure and/or heat-sensitive adhesives is given by J. Shields in "Adhesives Handbook", 3rd. ed. (1984), Butterworths—London, Boston, and by Ernest W. Flick in "Handbook of Adhesive Raw Materials" (1982), Noyens Publications, Park Ridge, N.J.—USA.

Another method of applying a protective element is not performed by lamination but simply by coating one or more, preferably two, protective layers, preferably polymeric layers, on top of the metal recording layer (see examples furtheron).

Between the subbing layer of the support and the bismuth layer an extra intermediate layer may be coated in order to realize the best comprise between a good adhesion and a good particle agglomeration in the exposed parts, the latter causing a low Dmin. Such intermediate layer can be based on e.g. gelatin+maleic acid, co(vinylidene chloride–itaconic acid–methymethacrylate)+silica sol+sorbitol+ polyethylenedioxythiophene+polystyrene sulphonic acid, recorcine+triacetine+polyethylene latex, gelatin+silica sol+ polymethylmethacrylate, gelatin+polybutadiene+silica sol+ hexanetriol+sulphosalicilic acid, gelatin+silica sol+ crystalline silica, etc..

In the subbing layer or in the intermediate layer as described above a roughening agent can be present in order to avoid interference patterns on laser exposure, as disclosed in EP 0 684 145. The roughening agent can be chosen from a wide variety of chemical classes and commercial products provided the particles chosen show an excellent mechanical and thermal stability. Preferred roughening agents include following:

- the spherical polymeric beads disclosed in U.S. Pat. No. 4,861,818;
- the alkali-soluble beads of U.S. Pat. No. 4,906,560 and EP 0 584 407;
- the insoluble polymeric beads disclosed in EP 0 466 982;
- polymethylmethacrylate beads;
- copolymers of methacrylic acid with methyl- or ethyl-methacrylate;
- TOSPEARL siloxane particles (e.g. types T105, T108, T103, T120), marketed by Toshiba Co;
- SEAHOSTAR polysiloxane—silica particles (e.g. type KE-P50), marketed by Nippon Shokubai Co;
- ROPAQUE particles, being polymeric hollow spherical core/sheat beads, marketed by Rohm and Haas Co, and described e.g. is U.S. Pat. Nos. 4,427,836, 4,468,498 and 4,469,825;
- ABD PULVER, marketed by BASF AG;
- CHEMIPEARL, spherical polymeric particles, marketed by Misui Petrochemical Industries, Ltd.

In a most preferred embodiment the roughening agent is composed of polymethylmethacrylate beads. They preferably have an average particle size of about 0.3 $\mu$m.

For the formation of a heat mode image using the element of the present invention any laser can be used which provides enough energy needed for the production of sufficient heat for this particular process of image formation. In a preferred embodiment a powerful infra-red laser is used, most preferably a Nd-YLF laser or diode laser.

Depending on parameters such as the adhesion- and cohesion balances in the material and the intensity of the laser recording different types of image formation can occur during laser recording:

1. coagulation of the metal particles in the exposed parts whereby all layers remain adhered to each other;
2. coagulation of the metal particles in the exposed parts whereby the metal layer and the top layer(s) are partially or totally removed by ablation);
3. coagulation of the metal particles in the exposed parts whereby all or a part of the top layer(s) are removed by ablation.

In the last two cases Dmin can further be lowered by a dry or a wet rub off treatment or by a wet spray.

The present invention will be illustrated now by the following examples without however being limited thereto.

EXAMPLES

Example 1

This example demonstrates that the agglomeration of a thin bismuth layer into beads by means of IR radiation is unexpectedly found to work well if a coated bismuth layer is used, consisting of bismuth particles embedded in a binding agent, instead of an in vacuo vapour-deposited pure bismuth layer.

Preparation of Dispersion A

| Solution 1 | |
|---|---|
| Na$_4$EDTA | 70 g |
| Water | 335 ml |
| HCl (5%) up to pH = 12 | 15 ml |
| Bi(NO$_3$)$_3$.5H$_2$O | 58 g |
| CMC (3% in water) | 175 ml |
| Na$_6$O$_{18}$P$_6$ (2% in water) | 23 ml |

Solution 1 was prepared as follows: to a mixture of 70 g of Na$_4$EDTA in 350 ml of water at pH 12, held at 40° C. and stirred at 250 rpm, 58 g of Bi(NO$_3$)$_3$.5H$_2$O was added in small portions until a clear solution was obtained. Then 175 ml of a 3% solution of carboxymethyl cellulose (high viscosity) and 23 ml of a 2% solution of sodium hexametaphosphate were added.

Solution 1 was vigorously stirred (9500 rpm) and 37 g of sodium hydrosulphite were added in small portions. After 15 minutes, about 90% of the bismuth was reduced to metal bismuth particles with a mean diameter of 50 nm.

The metal bismuth dispersion was ultracentrifuged at 15.000 rpm during one hour and the liquid phase was decanted. Fresh water was added and the ultracentrifuge procedure was repeated. The bismuth-CMC deposit was redispersed with 120 ml of a 0.2% solution of sodium hexametaphosphate.

The dispersion was stirred and 1 g of ascorbic acid, 5 ml of a 9.5% solution of Ultravon W (Ciba Geigy) in water/ethanol (80/20) and 2 ml of a 12.5% solution of Saponine Quillaya (Schmittmann) in water/ethanol (80/20) are added (Dispersion A).

Preparation of coated Sample A

Subsequently the dispersion was coated on a substrated PET foil so that a density of 3.5 (Macbeth optical densitometer) was obtained.

Thereupon the coated bismuth dispersion was laminated with a protective laminate comprising a 8 $\mu$m thick pressure-adhesive layer, type DURO-TAK 380-2954, National Starch and Chemical Co., and a 12 $\mu$m thick PET foil. This laminate was purchased from Rexham Co. This constitutes sample A.

Preparation of coated Sample B (comparison)

Sample B was a reference sample (MASTERTOOL MT8, Agfa-Gevaert), composed of an in vacuo deposited bismuth layer and laminated in vacu with the same Rexham laminate. For more details we refer to the description of the film in *Circuit World*, Vol. 22 No. 3, 1996.

Exposure

The exposure was performed by a NdYLF laser emitting at 1064 nm. The image plane power was set between 200 and 450 mW maximum with intervals of 50 mW. A spot size of 16 $\mu$m was used together with a pitch of 8 $\mu$m at a scan speed of 4.4 m/s.

Table I lists the results of the exposure of the two samples.

TABLE I

| Sample | D$_{max}$ | D$_{min}$ | mW (*) |
|---|---|---|---|
| Sample A (inv) | 3.5 | 0.48 | 350 |
| | 3.5 | 0.40 | 300 |
| Sample B (comp) | 3.5 | 0.25 | 350 |
| | 3.5 | 0.25 | 300 |

(*) image plane power

As can be seen from table I, the coated sample A shows an unexpected good respons to the IR-laser exposure. Despite the presence of a binding agent, the microscopic images show an analogous bead formation of the bismuth upon exposure, causing a decrease in density.

Example 2

This example was designed to illustrate the influence of the binder.

Preparation of coating Sample C-1

A metal bismuth dispersion was prepared according to the preparation of sample A, except that for solution 1, 175 ml of a 6% solution of gelatine Koepff T7598 was used instead of 175 ml of the 3% solution CMC.

Preparation of coating sample C-2

A metal bismuth dispersion was prepared according to the preparation of sample A, except that for solution 1, 175 ml of a 3% solution of arabic gum was used instead of 175 ml of the 3% solution CMC.

Preparation of coating Sample C-3

A metal bismuth dispersion was prepared according to the preparation of sample A, except that for solution 1, 175 ml of a 3% solution of poly(acrylic acid) (VERSICOL E5, Allied Chem. Co.) was used instead of 175 ml of the 3% solution of CMC.

Table II lists the exposure results of these samples.

TABLE II

| Sample | Binder | $D_{max}$ | $D_{min}$ | mW (*) |
|---|---|---|---|---|
| Sample A | CMC | 3.5 | 0.40 | 350 |
| Sample C-1 | gelatine | 3.6 | 1.60 | 450 |
| Sample C-2 | arabic gum | 3.4 | 0.50 | 350 |
| Sample C-3 | poly(acrylic acid) | 3.0 | 1.40 | 450 |

(*) minimum image plane power in order to obtain the lowest $D_{min}$

From table I it appears that in terms of lowest $D_{min}$ carboxymethylcellulose is the best binder.

Example 3

This example illustrates the role of ascorbic acid. Table III lists the decrease in density of Sample A with and of a similar sample without ascorbic acid as a function of time.

TABLE III

| Ascorbic acid | $D_{max}$ fresh | $\Delta D_{max}$ 1 day | $\Delta D_{max}$ 2 days | $\Delta D_{max}$ 3 days | $\Delta D_{max}$ 5 days | $\Delta D_{max}$ 7 days | $\Delta D_{max}$ 15 days |
|---|---|---|---|---|---|---|---|
| no | 3.2 | −0.05 | −0.08 | −0.08 | −0.10 | −0.12 | −0.17 |
| yes (comp) | 3.6 | 0.00 | 0.00 | 0.00 | 0.00 | −0.01 | −0.06 |

It is clear that the presence of ascorbic acid is effective in avoiding density loss.

Example 4

This example demonstrates that the bismuth layer can be successfully coated with one or two protective coatings instead of laminating a protective element.

The same sample A was prepared again, but there was no lamination step. Instead, various samples of A were coated with one or two layers according to table IV. The exposure results are listed in table V.

TABLE IV

| Sample | Coating I | Coating II |
|---|---|---|
| A (ref.) | laminate | — |
| D-1 | polymethyl metacrylate | — |
| D-2 | copolyester | — |
| D-3 | polystyrene | — |
| D-4 | poly vinyl alcohol | — |
| D-5 | co(ethylacrylate-metacrylic acid) | — |
| D-6 | gelatine | — |
| D-7 | co(vinylidene chloride-metacrylic acid-itaconic acid) | — |
| D-8 | co(methyl metacrylate-butadiene) | — |
| D-9 | co(ethyl acrylate-methyl metacrylate-metacrylic acid) | — |
| D-10 | ucecryl (UCB) | co(ethylacrylate-metacrylic acid) |
| D-11 | poly acrylate | co(ethylacrylate-metacrylic acid) |
| D-12 | co(methyl metacrylate-butadiene) | co(ethylacrylate-metacrylic acid) |
| D-13 | neocryl BT9 (UCB) | co(ethylacrylate-metacrylic acid) |
| D-14 | neocryl BT26 (UCB) | co(ethylacrylate-metacrylic acid) |
| D-15 | polyvinylisobutylether | co(ethylacrylate-metacrylic acid) |
| D-16 | polyvinylmethylether | co(ethylacrylate-metacrylic acid) |
| D-17 | carnaubawax | co(ethylacrylate-metacrylic acid) |
| D-18 | neocryl BT9 (UCB) | polyethylene |
| D-19 | neocryl BT9 (UCB) | co(ethyl acrylate-methyl metacrylate-metacrylic acid |

TABLE V

| Sample | Adhesion before exposure () | Adhesion after exposure () | $D_{max}$ | $D_{min}$ | mW (*) |
|---|---|---|---|---|---|
| A (ref.) | 0 | 0 | 3.50 | 0.50 | 350 |
| D-1 | 3 | 3 | 2.20 | 0.70 | 300 |
| D-2 | 3 | 3 | 2.20 | 0.90 | 300 |
| D-3 | 3 | 3 | 2.20 | 0.70 | 350 |
| D-4 | 2 | 3 | 2.20 | 0.60 | 350 |
| D-5 | 0 | 3 | 2.20 | 0.60 | 300 |
| D-6 | 0 | 1–2 | 2.20 | 0.70 | 350 |
| D-7 | 0 | 3 | 2.20 | 0.40 | 300 |
| D-8 | 0 | 1 | 2.20 | 0.70 | 350 |
| D-9 | 1 | 3 | 2.20 | 0.60 | 350 |
| D-10 | 0 | 0 | 4.20 | 0.40 | 350" |
| D-11 | 3 | 3 | 4.20 | 0.60 | 250" |
| D-12 | 3 | 3 | 4.20 | 0.70 | 250" |
| D-13 | 0 | 0–1 | 4.20 | 0.50 | 300" |
| D-14 | 0 | 2 | 4.20 | 0.40 | 350" |
| D-15 | 0 | 1 | 3.10 | 0.60 | 250" |
| D-16 | 0 | 2–3 | 4.20 | 0.50 | 300" |
| D-17 | 3 | 3 | 4.40 | 0.45 | 200" |
| D-18 | 0 | 2 | 4.20 | 0.60 | 250" |
| D-19 | 3 | 3 | 4.20 | 0.50 | 300" |

(*) minimum image plane power in order to obtain the lowest $D_{min}$
(**) standard tape test with TESA Tape 4122; 0 = good adhesion, 4 = no adhesion
" scanspeed = 2.2 m/s (*) minimum image plane power in order to obtain the lowest $D_{min}$
(**) standard tape test with TESA Tape 4122; 0=good adhesion, 4=no adhesion
" scanspeed=2.2 m/s It is clear that in general the reference sample having the laminate shows the best result for adhesion.

Example 5

This example demonstrates that instead of adding the reducing agent as a solid to the Bi salt solution it can be added as a separate solution according to a single jet method or to a double jet method.

Preparation of Dispersion B (single jet)

| Solution 2 | |
|---|---|
| $Na_2S_2O_4$ | 110 g |
| water | 550 ml |

Solution 2 was added at a rate of 50 ml/min to Solution 1 during 11 minutes, maintaining the pH at 9.2. After the precipitation, the dispersion was ultrafiltrated through a Fresenius F60 cartridge and diafiltrated with a 0.2% solution of sodium hexametaphosphate.

The dispersion was stirred and 1 g of ascorbic acid, 5 ml of a 9.5% solution of Ultravon W (Ciba Geigy) in water/ethanol (80/20) and 2 ml of a 12.5% solution of Saponine Quillaya (Schmittmann) in water/ethanol (80/20) were added (Dispersion B).

Preparation of Dispersion C (double jet)

To a vessel of 6 liter containing 1 l water, Solution 1 was added at a flow rate of 50 ml/min simultaneously with Solution 2 at a flow rate of 25 ml/min. After the precipitation, the dispersion was ultrafiltrated through a Fresenius F60 cartridge and diafiltrated with a 0.2% solution of sodium hexametaphosphate.

The dispersion was stirred and 1 g of ascorbic acid, 5 ml of a 9.5% solution of Ultravon W (Ciba Geigy) in water/ethanol (80/20) and 2 ml of a 12.5% solution of Saponine Quillaya (Schmittmann) in water/ethanol (80/20) are added (Dispersion C).

Preparation of Samples E-1 and E-2

Dispersion B and C were coated according to the described coating procedure for Sample A and were called Sample E-1 (single jet) and Sample E-2 (double jet) respectively.

Table VI lists the exposure results of the prepared samples.

TABLE VI

| Sample | Reduction | $D_{max}$ | $D_{min}$ | mW (*) |
|---|---|---|---|---|
| A (control) | solid $Na_2S_2O_4$ | 3.50 | 0.40 | 300 |
| G-1 | single jet | 3.50 | 0.43 | 350 |
| G-2 | double jet | 3.80 | 0.40 | 350 |

(*) minimum image plane power in order to obtain the lowest $D_{min}$ (*) minimum image plane power in order to obtain the lowest $D_{min}$ The results are similar for the three methods of addition of the reducing agent.

Example 6

This example demonstrates that other Bi-complexes or other reducing agents can be used.

Preparation of Dispersion D

| Solution 3 | |
|---|---|
| $KBH_4$ | 11 g |
| water | 550 ml |

Dispersion D was prepared as described for Dispersion C (double jet), except that Solution 3 was used instead of Solution 2.

Preparation of Dispersion E

| Solution 4 | |
|---|---|
| DTPA | 100 g |
| Water | 335 ml |
| HCl (5%) (pH = 12) | 15 ml |
| $Bi(NO_3)_3.5H_2O$ | 58 g |
| CMC (3% in water) | 175 ml |
| $Na_6O_{18}P_6$ (2% in water) | 23 ml |

Dispersion E was prepared as described for Dispersion D (double jet), except that Solution 4 was used instead of Solution 1.

Preparation of Dispersion F

| Solution 5 | |
|---|---|
| Ammonium citrate | 100 g |
| Water | 335 ml |
| $NH_4OH$ (10%) (pH = 8.5) | — ml |
| $Bi(NO_3)_3.5H_2O$ | 58 g |
| CMC (3% in water) | 175 ml |
| $Na_6O_{18}P_6$ (2% in water) | 23 ml |

Dispersion F was prepared as described for Dispersion C (double jet), except that Solution 5 was used instead of Solution 1.

Both Dispersions D, E and F were coated as was described for Sample A giving rise to to Samples F-1, F-2 and F-3 respectively.

Table VII lists the exposure results.

TABLE VII

| Sample | $D_{max}$ | $D_{min}$ | mW (*) |
|---|---|---|---|
| A (control) | 3.50 | 0.40 | 300 |
| F-1 | 3.70 | 0.90 | 200 |
| F-2 | 3.00 | 0.40 | 200 |
| F-3 | 3.00 | 0.30 | 250 |

(*) minimum image plane power in order to obtain the lowest $D_{min}$ (*) minimum image plane power in order to obtain the lowest $D_{min}$ It is clear from the table that other complexants and other reducing agents can be used.

What is claimed is:

1. Process for the preparation of a heat mode recording element comprising a transparent support and a thin metal recording layer, characterized in that said thin metal layer is formed by the following steps:
   (1) preparing an aqueous medium containing ions of a metal,
   (2) reducing said metal ions by a reducing agent thus forming metal particles,
   (3) coating said aqueous medium containing said metal particles on said transparent support.

2. Process according to claim 1 wherein said ions of a metal are bismuth ions, and said metal particles are bismuth particles.

3. Process according to claim 2 wherein the particle size of said bismuth particles is comprised between 10 and 200 nm.

4. Process according to claim 2 wherein said bismuth ions are brought in solution as bismuth nitrate and are maintained in solution by means of a complexant.

5. Process according to claim 4 wherein said complexant is ethylenediamine-tetraacetic acid (EDTA) or a salt thereof, or a citrate.

6. Process according to claim 1 wherein said aqueous medium further contains a protective binder.

7. Process according to claim 6 wherein said protective binder is carboxymethylcellulose.

8. Process according to claim 1 wherein said reducing agent is $Na_2S_2O_4$ or $KBH_4$.

9. Process according to claim 1 wherein said process following said forming of said metal particles further comprises removal of all superfluous ions from the solution containing said metal particles.

10. Process according to claim 1 wherein said aqueous medium further comprises an antioxidant, added in any stage of the process.

11. Process according to claim 10 wherein said antioxidant is ascorbic acid, a derivative thereof, or a salt derivative thereof.

12. Process according to claim 1 further comprising the step of laminating a protective element comprising an adhesive layer and an organic resin foil applied in that order on top of said thin metal recording layer.

13. Process according to claim 1 further comprising the step of coating at least one protective layer on top of said thin metal recording layer.

14. Heat mode recording element prepared by a process according to claim 1.

15. Process for the preparation of a heat mode recording element comprising a transparent support and a thin metal recording layer, characterized in that said thin metal layer is formed by the following steps:
    (1) preparing an aqueous medium containing ions of a metal and a dispersing aid,
    (2) reducing said metal ions by a reducing agent thus forming metal particles,
    (3) coating said aqueous medium containing said metal particles on said transparent support.

16. Process according to claim 15 wherein said dispersing aid is a hexametaphosphate.

* * * * *